(12) United States Patent
Hamidi-Sepehr et al.

(10) Patent No.: US 11,202,313 B2
(45) Date of Patent: Dec. 14, 2021

(54) METHOD OF UPLINK CONTROL SIGNALING FOR NON-SCHEDULED UPLINK OPERATION OVER UNLICENSED SPECTRUM

(71) Applicant: Apple Inc., Cupertino, CA (US)

(72) Inventors: Fatemeh Hamidi-Sepehr, Santa Clara, CA (US); Abhijeet Bhorkar, Fremont, CA (US); Qiaoyang Ye, Fremont, CA (US); Huaning Niu, Milpitas, CA (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/071,893

(22) PCT Filed: Sep. 2, 2016

(86) PCT No.: PCT/US2016/050237
§ 371 (c)(1),
(2) Date: Jul. 20, 2018

(87) PCT Pub. No.: WO2017/146772
PCT Pub. Date: Aug. 31, 2017

(65) Prior Publication Data
US 2019/0037598 A1 Jan. 31, 2019

Related U.S. Application Data

(60) Provisional application No. 62/298,866, filed on Feb. 23, 2016, provisional application No. 62/299,976, filed on Feb. 25, 2016.

(51) Int. Cl.
*H04W 74/08* (2009.01)
*H04L 1/00* (2006.01)
(Continued)

(52) U.S. Cl.
CPC ....... *H04W 74/0808* (2013.01); *H04L 1/0003* (2013.01); *H04L 1/1812* (2013.01);
(Continued)

(58) Field of Classification Search
CPC ......... H04W 74/0808; H04W 72/0413; H04W 72/14; H04W 74/0816; H04L 1/0003; H04L 1/1812; H04L 5/0057
See application file for complete search history.

(56) References Cited

U.S. PATENT DOCUMENTS 10,278,163 B2 * 4/2019 Lee ........................ H04W 72/14
2009/0196238 A1 8/2009 Cheng et al.
(Continued)

OTHER PUBLICATIONS

International Preliminary Report on Patentability for International Patent Application No. PCT/US16/50237, dated Sep. 7, 2018.
(Continued)

*Primary Examiner* — Donald L Mills
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry and a second circuitry. The first circuitry may be operable to encode a Non-scheduled Physical Uplink Control Channel (N-PUCCH) in an Uplink (UL) burst transmission, and to encode a Physical Uplink Shared Channel (PUSCH) in the UL burst transmission. The second circuitry may be operable to initiate the UL burst transmission subject to a Listen-Before-Talk (LBT) protocol on a channel of the wireless network. The UL burst transmission may be initiated without a UL grant received from the eNB.

24 Claims, 10 Drawing Sheets

(51) Int. Cl.
*H04L 1/18* (2006.01)
*H04L 5/00* (2006.01)
*H04W 72/04* (2009.01)
*H04W 72/14* (2009.01)

(52) U.S. Cl.
CPC ....... *H04L 5/0057* (2013.01); *H04W 72/0413* (2013.01); *H04W 72/14* (2013.01); *H04W 74/0816* (2013.01)

(56) References Cited

U.S. PATENT DOCUMENTS

| | | | |
|---|---|---|---|
| 2011/0216722 A1* | 9/2011 | Yang | H04W 12/062 370/329 |
| 2015/0085797 A1 | 3/2015 | Ji et al. | |
| 2015/0131536 A1 | 5/2015 | Kaur et al. | |
| 2015/0181589 A1* | 6/2015 | Luo | H04W 74/0833 370/329 |
| 2016/0366704 A1* | 12/2016 | Lee | H04W 72/0413 |
| 2017/0027002 A1* | 1/2017 | Yerramalli | H04W 74/004 |
| 2017/0231011 A1* | 8/2017 | Park | H04W 72/0446 |
| 2017/0238334 A1* | 8/2017 | Yang | H04W 74/0816 370/336 |
| 2017/0325215 A1* | 11/2017 | Takeda | H04W 16/14 |
| 2018/0115983 A1* | 4/2018 | Harada | H04W 72/0406 |

OTHER PUBLICATIONS

International Search Report and Written Opinion for International Patent Application No. PCT/US2016/050237, dated Dec. 5, 2016.

* cited by examiner

300

METHOD OF UPLINK CONTROL SIGNALING FOR NON-SCHEDULED UPLINK OPERATION OVER UNLICENSED SPECTRUM

CLAIM OF PRIORITY

The present application is a National Stage Entry of, and claims priority to, International Patent Application Serial Number PCT/US16/50237, filed on Sep. 2, 2016 and entitled "Method Of Uplink Control Signaling For Non-Scheduled Uplink Operation Over Unlicensed Spectrum", which claims priority under 35 U.S.C. § 119(e) to U.S. Provisional Application Ser. No. 62/298,866 filed Feb. 23, 2016 and entitled "UL Control Signaling For Non-Scheduled Uplink Operation Over Unlicensed Spectrum," and to U.S. Provisional Patent Application Ser. No. 62/299,976 filed Feb. 25, 2016 and entitled "UL Control Signaling For Non-Scheduled Uplink Operation Over Unlicensed Spectrum," which are herein incorporated by reference in their entirety.

BACKGROUND

Various wireless cellular communication systems have been implemented and are being implemented. Systems that have been developed include 3rd Generation Partnership Project (3GPP) Universal Mobile Telecommunications System (UMTS) systems, 3GPP Long-Term Evolution (LTE) systems, and 3GPP LTE-Advanced (LTE-A) systems. Systems that are being developed include next-generation wireless cellular communication systems based upon LTE and LTE-A systems are being developed, such as fifth generation (5G) wireless systems/5G mobile networks systems.

Next-generation wireless cellular communication systems may provide support for higher bandwidths in part by supporting License-Assisted Access to unlicensed spectrum.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced system, and a 5th Generation wireless system/5th Generation mobile networks (5G) system/5th Generation new radio (NR) system.

Successive generations of wireless cellular technology seek to use ever higher data rates. However, usable licensed spectrum is limited. The limits on licensed spectrum have fostered an emerging interest in the operation of LTE systems (and successor systems) in unlicensed spectrum. For example, License-Assisted Access (LAA) may facilitate operation of LTE systems compliant with 3GPP Release 13 (open, end date 2016 Mar. 11, SP-71).

Meanwhile, in scheduled-based Uplink (UL) design, UL Physical Uplink Shared Channel (PUSCH) transmission may be based upon an explicit UL grant transmission via Physical Downlink Control Channel (PDCCH), for example via Downlink Control Information (DCI) format 0. In scheduled-based UL LAA design, an Evolved Node-B (eNB) may complete a Listen-Before-Talk (LBT) procedure on a component carrier over which PUSCH is expected. If the LBT at the eNB is successful, the eNB may then transmit a UL grant (e.g., via PDCCH). After receiving the UL grant, a User Equipment (UE) may perform an LBT procedure (e.g., a short LBT, which may span 25 microseconds (µs), or a Category-4 LBT) during the allocated time interval. If the LBT at the UE is successful, the UE may then transmit PUSCH as scheduled, on the resources indicated by the UL grant.

In some embodiments, LTE operation in unlicensed spectrum may include operation via Dual Connectivity (DC) based LAA. For some embodiments, operation in unlicensed spectrum may include standalone LTE operation in unlicensed spectrum, in which LTE-based technology may operate in unlicensed spectrum alone and might not require an "anchor." For example, standalone LTE operation in unlicensed spectrum may comprise MulteFire™ technology.

In studies of scheduled-based UL LAA design, throughput performance has been identified as being noticeably degraded. One reason for the performance degradation may be that the UE may be disposed to being scheduled for UL transmission after a predetermined number of subframes have elapsed, due to constraints on UE processing delays for UL grants.

Figure 1:
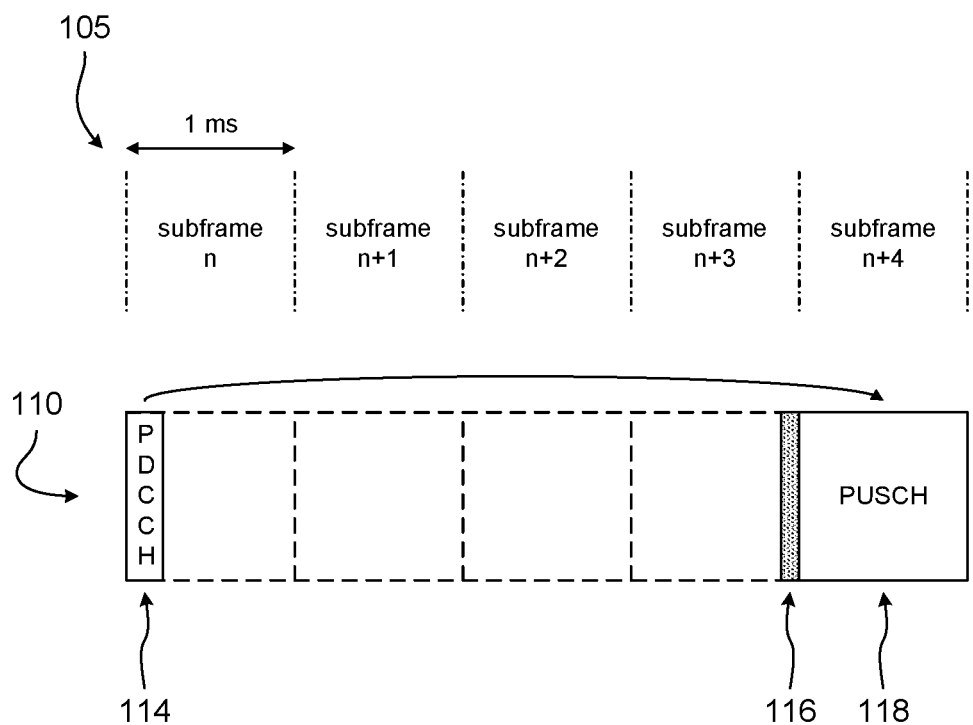
FIG. 1 illustrates a scenario of Uplink (UL) scheduling in which a Physical Uplink Shared Channel (PUSCH) may be transmitted on a fourth subframe following a subframe in which a Physical Downlink Control Channel (PDCCH) scheduling the PUSCH is transmitted, in accordance with some embodiments of the disclosure.

For example, FIG. 1 illustrates a scenario of UL scheduling in which a PUSCH may be transmitted on a fourth subframe following a subframe in which a PDCCH scheduling the PUSCH is transmitted, in accordance with some embodiments of the disclosure. A scenario 100 may comprise a traffic stream 110 over a plurality of subframes 105 (which may be, for example, 1 millisecond (ms) in duration). Traffic stream 110 may in turn comprise various types of DL and UL traffic.

In scenario 100, which may correspond to a legacy LTE scheduled-based UL LAA design, a PDCCH 114 may be transmitted by an eNB in a subframe n of subframes 105. In transmitting PDCCH 114, the eNB may transmit an explicit UL grant. Subsequently, prior to subframe n+4 of subframes 105, a receiving UE may perform an LBT procedure 116. Subject to the success of LBT procedure 116, the UE may transmit a PUSCH 118. The 4-subframe delay incurred after PDCCH 114 for transmission of PUSCH 118—which may be due to UE processing delays related to the UL grant—may result in degraded UL performance in unlicensed spectrum.

Discussed herein are methods and designs for non-scheduled UL operation on unlicensed spectrum, including design of UL control signaling contents and transmission via a Non-Scheduled Physical Uplink Control Channel (N-PUCCH). An advantage of the methods and designs discussed herein may be improved UL performance in unlicensed operation.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy eNB, a next-generation or 5G eNB, an mmWave eNB, an mmWave small cell, an AP, and/or another base station for a wireless communication system. For purposes of the present disclosure, the term "UE" may refer to a UE, a 5G UE, an mmWave UE, an STA, and/or another mobile equipment for a wireless communication system.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

The non-scheduled modes of operation discussed herein may advantageously promote grant-less UL transmission. Various aspects regarding UL control signaling for non-scheduled UL transmissions (in LAA operation, and/or "standalone" operation such as in MulteFire' systems) are also discussed. Such UL control signaling for non-scheduled UL transmissions may be provided via N-PUCCH.

In a non-scheduled mode of operation, an eNB might not be aware of a UE's transmissions. As a result, in non-scheduled operation, an eNB may need to detect a UL burst, and may need to acquire a variety of related parameters from a UE. In various embodiments, the parameters may include: a Radio Network Temporary Identifier (RNTI) of the UE transmitting PUSCH; a Modulation and Coding Scheme (MCS) used for UL transmission (which, in some embodiments, may be common for all PUSCH subframes); a duration of the UL burst (in a number of symbols, or in a number of Transmission Time Intervals (TTIs)); and/or a number of component carriers used for the PUSCH transmission.

Some possible PUSCH detection methods (e.g., a preamble detection method) may provide some signaling. However, in comparison with such methods, explicit indication of required UL Control Information (UCI) through some sort of Physical Uplink Control Channel (PUCCH), such as an N-PUCCH, may advantageously be more reliable. For example, an N-PUCCH may more reliably provide signals related to DL link adaptation, MCS selection, and/or Hybrid Automatic Repeat Request (HARQ).

Figure 2:
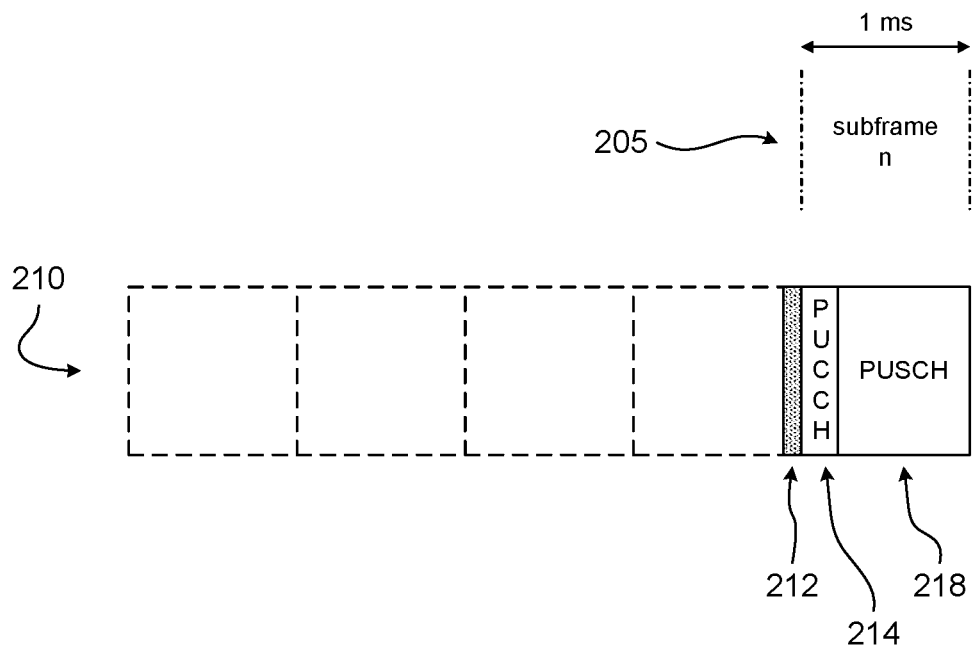
FIG. 2 illustrates a scenario of UL transmission in which a PUSCH may be transmitted following transmission of a Non-Scheduled Physical Uplink Control Channel (N-PUCCH), in accordance with some embodiments of the disclosure.

FIG. 2 illustrates a scenario of UL transmission in which a PUSCH may be transmitted following transmission of a Non-Scheduled Physical Uplink Control Channel (N-PUCCH), in accordance with some embodiments of the disclosure. A scenario 200 may comprise a traffic stream 210. In scenario 200, instead of an eNB transmitting a PDCCH to provide a UL grant for a subsequent PUSCH, a UE transmitting a PUSCH may first transmit a PUCCH 214 in a subframe n (e.g., subframe 205), subject to the success of an LBT procedure 212. PUCCH 214 may be an N-PUCCH (e.g., a Non-scheduled PUCCH). In comparison with the transmission of PUSCH 118 in scenario 100, the transmission of PUSCH 218 in scenario 200 does not incur a 4-subframe delay following an eNB-transmitted PDCCH.

In non-scheduled operation, a UE may perform operations similar to operations performed by an eNB in a scheduled mode of operation, and/or may provide signaling similar to signaling provided by an eNB in a scheduled mode of operation. The UE may also be disposed to autonomously handle PUSCH transmissions without eNB involvement.

In the embodiments discussed herein, a UE may establish the MCS to be used for PUSCH transmission. The UE may employ various methods for establishing the MCS. In a first variety of methods, the UE may establish the MCS based on explicit and/or implicit indication from an eNB. In some embodiments, the indication may be based upon a latest-received Sounding Reference Signal (SRS). In some embodiments, the indication may be semi-static: the MCS may be fixed for a period of time, and the UE may transmit PUSCH within that period of time with that MCS. From the eNB's perspective, there may be no fixed timeline, and UE transmission time may appear random. This may in turn affect how frequently the eNB may indicate the MCS to the UE.

In some embodiments, the indication may be provided explicitly, and the eNB may periodically indicate an appropriate MCS to the UE to assist UE operation. In some embodiments, the indication may be provided via RRC signaling, or may be provided via a DL PDCCH-like control channel. For some embodiments, the indication may be provided implicitly, for example by exploiting channel quality based on DL transmissions.

In a second variety of methods for establishing MCS, the UE may autonomously select the MCS. The selected MCS may be indicated to an eNB in a UL transmission, for example through UL control signaling (e.g., N-PUCCH transmissions). The selection of MCS may be dynamic. In some embodiments, the selection may be based at least in part upon feedback from an eNB, such as Channel Quality Indicator (CQI) and/or Channel State Information (CSI). In some embodiments, the selection may be based at least in part upon a UE's Acknowledgement (ACK) and/or Negative Acknowledgement (NACK) reception. The second variety of methods may be implementation specific.

In a third variety of methods for establishing MCS, the UE may choose the MCS indicated by the eNB via Radio Resource Control (RRC) signaling. In some embodiments, the RRC signaling may be based on DL transmissions. In some embodiments, the UE may choose the MCS indicated by RRC if it has not received CSI feedback and/or a dynamic MCS indication from the eNB within a predetermined period of time, such as an interval of T seconds.

In the embodiments discussed herein, a UE may also provide various control-information parameters to an eNB via signaling in support of non-scheduled UL transmissions (e.g., via an N-PUCCH), and in support of autonomous handling of PUSCH retransmission.

In some embodiments, a UE may provide a Cell RNTI (C-RNTI) and/or another UE identifier. For some embodiments (e.g., for embodiments comprising an autonomously-selected MCS), a UE may provide a selected MCS for PUSCH transmission. The rate-matching may depend upon a TBS (Transport Block Size), and the modulation scheme may be known at the point of demodulation. In some embodiments, although the eNB may know about the MCS used (e.g., the TBS and/or modulation) after passage of some time, and even in the presence of periodic indications by eNB regarding MCS, a UE may provide a selected MCS.

In some embodiments, a UE may provide a HARQ process number or identity. For some embodiments, a UE may provide a New Data Indicator (NDI). For some embodiments, a UE may provide a Redundancy Version (RV). In some embodiments, a UE may provide an indicator of a UL burst transmission duration (in, for example, a number of subframes, or a number of TTI). A transmission duration may help an eNB to perform blind detection for the presence of PUSCH. A transmission duration may also be helpful to indicate a duration of a next UL burst based on the UL load (or an estimate thereof). A UE may also indicate whether or not a current burst comprises its last UL transmission.

For some embodiments, a UE may provide an indicator of time-frequency resources to be used for a PUSCH transmission. In some embodiments, a UE may provide signaling to request potentially periodic CSI and/or CQI information from an eNB. Link adaptation and MCS selection at the UE may be performed at least in part based on the CQI feedback. For some embodiments, a UE may provide a number of component carriers used for a PUSCH transmission. In some embodiments, a UE may provide a UL transmission mode indicator. For example, a UL transmission mode indicator may have a first value indicating mode 1 transmission (which may be a default mode), and may have a second value indicating mode 2 transmission (which may be for Multiple Input Multiple Output (MIMO) closed-loop spatial multiplexing). For some embodiments, a UE may provide a CQI indicator, which may be used by an eNB to adjust MCS.

In some embodiments, precoding information might not be signaled, since it may be applied on a Demodulation Reference Signal (DMRS). A UE may apply any valid precoding since the DMRS may also apply the same precoding. For some embodiments, a UE's choice of precoding may be based on CSI feedback. In some embodiments, a UE's choice of precoding may be implementation specific.

Figure 3:
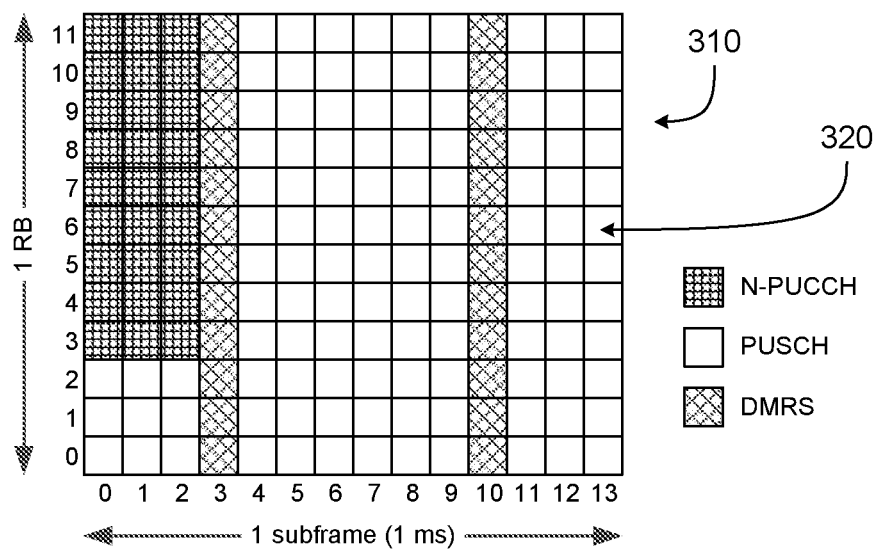
FIG. 3 illustrates a scenario of UL transmission including an N-PUCCH and a PUSCH, in accordance with some embodiments of the disclosure.

FIG. 3 illustrates a scenario of UL transmission including an N-PUCCH and a PUSCH, in accordance with some embodiments of the disclosure. In scenario 300, a Resource Block (RB) 310 may comprise a plurality of Resource Elements (REs) 320 spanning 14 OFDM symbols (which may be enumerated from 0-13) and spanning 12 subcarriers (which may be enumerated from 0-11).

In some embodiments, N-PUCCH and PUSCH may be multiplexed within RB 310. Some REs 320 may carry N-PUCCH, and other REs 320 may carry PUSCH. For example, REs in OFDM symbols 0, 1, and 2 may carry N-PUCCH in subcarriers 3 through 11. In addition, in some embodiments, N-PUCCH and PUSCH may be separately encoded. Meanwhile, some REs 320 may carry DMRS (e.g., REs 320 in OFDM symbols 3 and 10).

For non-scheduled operation, in various embodiments, at least a subset of REs 320 in the first OFDM symbol (e.g., OFDM symbol 0) may carry N-PUCCH. By locating control information within the first OFDM symbol, an eNB may thereby advantageously be able to first decode control information (which may include scheduling information describing the transmitted PUSCH), then begin decoding data (e.g., in the transmitted PUSCH) based upon decoded control information. In various embodiments, N-PUCCH may be carried in a first subframe, or in any possible subset of a UL burst.

In some embodiments, UL control information may be transmitted via enhanced PUCCH (ePUCCH), a control channel which may be considered for purposes of operation over unlicensed spectrum. UL control information may then be multiplexed with DL HARQ and/or ACK feedback. In some such embodiments, control information may be frequency-multiplexed with PUSCH.

For some embodiments, with respect to payload size, UL control information for non-scheduled mode may be disposed to span approximately 12 bits (depending upon a supported number of HARQ process identities): up to 4 bits for HARQ process ID (for example, 16 HARQ process IDs require 4 bits); 5 bits for MCS; 2 bits for RV; and 1 bit for NDI. A legacy PUCCH format 3 may provide support for up to 21 bits of information, and some embodiments may accordingly use a legacy LTE PUCCH format 3. In one embodiment, PUCCH resources may be reused to provide information regarding an ongoing UL burst in non-scheduling operation, and signaling from legacy LTE PUCCH design that are not required in non-scheduled mode may be removed. Legacy LTE formats 2, 2a, and/or 2b may provide support for up to 11 bits of information, and some embodiments may accordingly use a legacy LTE PUCCH format 2, 2a, and/or 2b (such as embodiments employing smaller numbers of HARQ process IDs).

Figure 4:
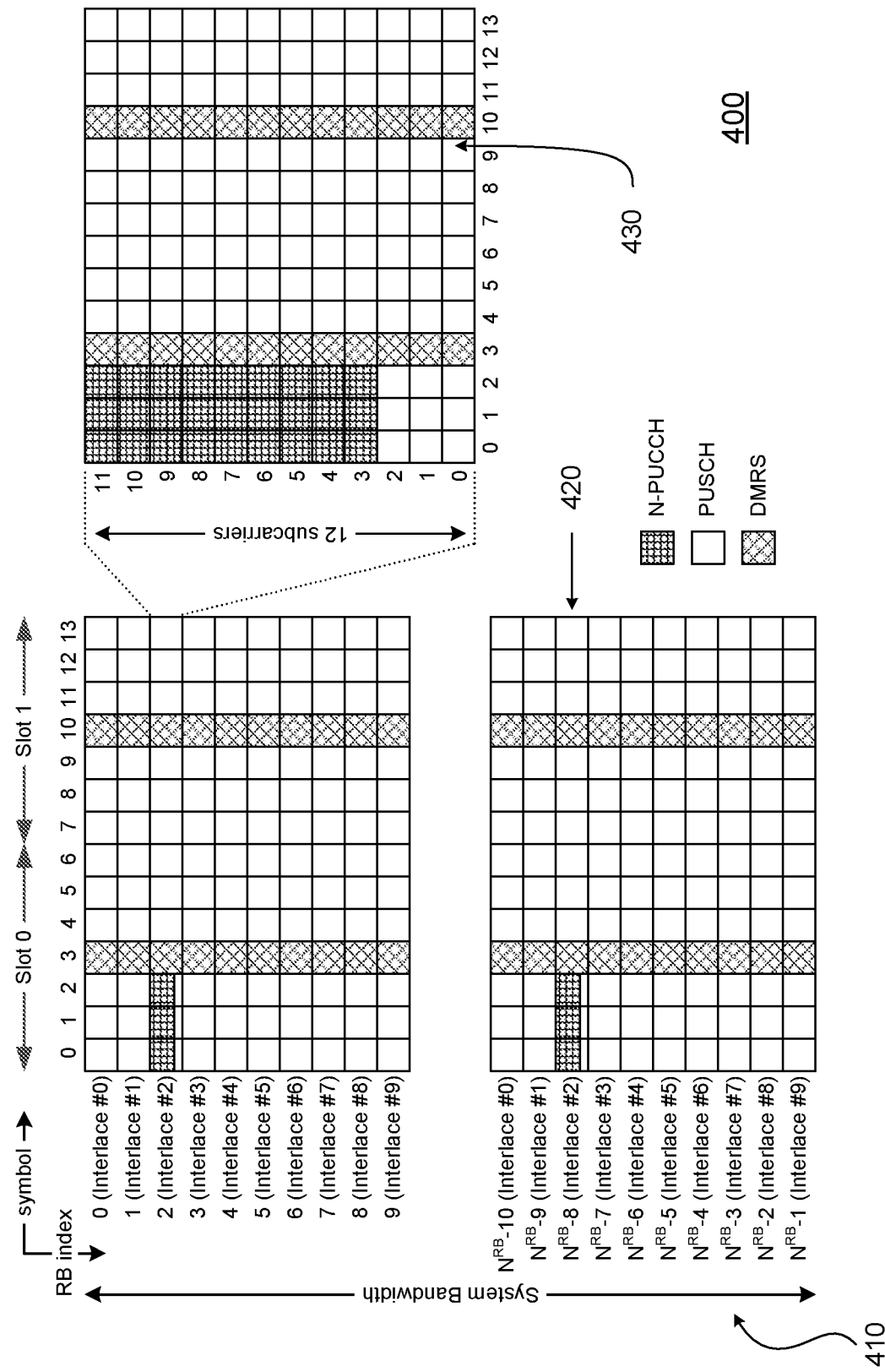
FIG. 4 illustrates an interleaved UL transmission structure including an N-PUCCH and a PUSCH, in accordance with some embodiments of the disclosure.

In some embodiments of standalone LTE operation in unlicensed spectrum (which may comprise MulteFire' based embodiments), UL transmission may employ an interlaced structure. For example, a system having a 20 MHz system bandwidth may comprise 100 PRBs interlaced with each other in 10 interlaces, with 10 RBs in each interlace. FIG. 4 illustrates an interleaved UL transmission structure including an N-PUCCH and a PUSCH, in accordance with some embodiments of the disclosure.

In UL transmission structure 400, a system bandwidth 410 may comprise a plurality of RBs 420 associated with a plurality of interlaces. (On the left side of the figure, the RBs 420 are depicted as being vertically compressed, and the subcarriers spanned by RBs 420 are not separately illustrated.) RBs 420 are depicted as spanning system bandwidth 410 from an initial RB 420 (which may be enumerated as number 0) through a last RB 420 (which may be enumerated as number $N^{RB}-1$). RBs 420 may be equidistantly spaced in 10 interlaces (which may be enumerated from 0 through 9).

In some embodiments of UL transmission structure 400, one or more RBs 420 may have a structure substantially similar to RB 320 of FIG. 3. Each RB 420 may comprise a plurality of REs 430 spanning a plurality of OFDM symbols and spanning a plurality of subcarriers. For example, as depicted, each RB 420 may span 14 OFDM symbols (which may be enumerated from 0-13) and may span 12 subcarriers (which may be enumerated from 0-11). A first subset of the REs 430 in the first-transmitted symbols (e.g., OFDM symbols 0, 1, and 2 in subcarriers 3 through 11) may carry N-PUCCH, a second subset of REs 430 may carry DMRS (e.g., in OFDM symbols 3 and 10), a third subset of REs 430 may carry PUSCH (e.g., outside of REs 430 carrying N-PUCCH and/or DMRS).

In various embodiments, N-PUCCH may need a relatively small number of resources. However, in some embodiments of standalone LTE operation in unlicensed spectrum (which may include MulteFire™ based embodiments), a smallest resource allocation granularity may be 10 RBs. In some such embodiments, allocation of one interlace over one subframe for N-PUCCH transmission may be inefficient. Accordingly, for some embodiments, N-PUCCH and PUSCH may be frequency multiplexed, by allocating different interlaces to N-PUCCH and PUSCH.

Figure 5:
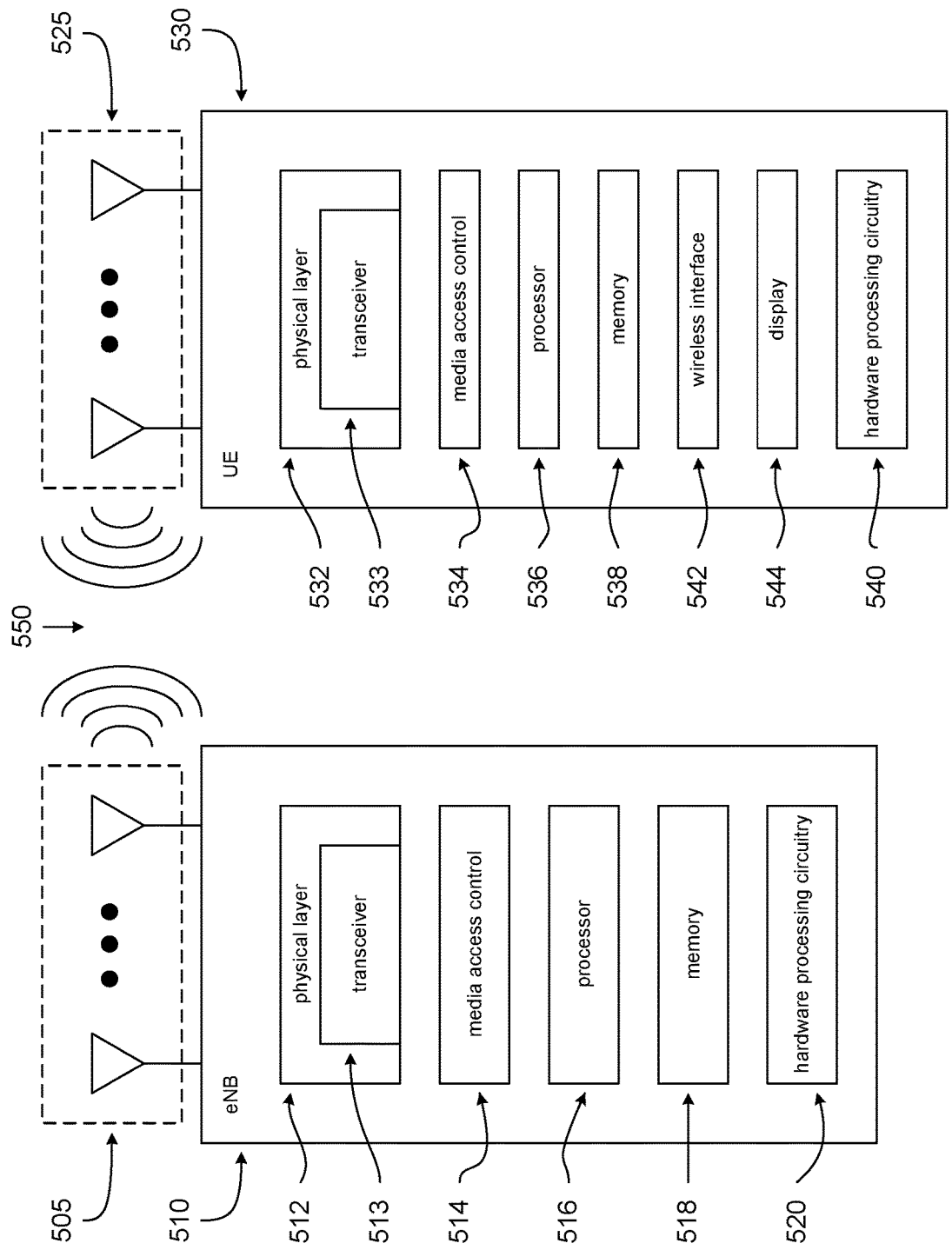
FIG. 5 illustrates an Evolved Node B (eNB) and a User Equipment (UE), in accordance with some embodiments of the disclosure.

FIG. 5 illustrates an eNB and a UE, in accordance with some embodiments of the disclosure. FIG. 5 includes block diagrams of an eNB 510 and a UE 530 which are operable to co-exist with each other and other elements of an LTE network. High-level, simplified architectures of eNB 510 and UE 530 are described so as not to obscure the embodiments. It should be noted that in some embodiments, eNB 510 may be a stationary non-mobile device.

eNB 510 is coupled to one or more antennas 505, and UE 530 is similarly coupled to one or more antennas 525. However, in some embodiments, eNB 510 may incorporate or comprise antennas 505, and UE 530 in various embodiments may incorporate or comprise antennas 525.

In some embodiments, antennas 505 and/or antennas 525 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 505 are separated to take advantage of spatial diversity.

eNB 510 and UE 530 are operable to communicate with each other on a network, such as a wireless network. eNB 510 and UE 530 may be in communication with each other over a wireless communication channel 550, which has both a downlink path from eNB 510 to UE 530 and an uplink path from UE 530 to eNB 510.

As illustrated in FIG. 5, in some embodiments, eNB 510 may include a physical layer circuitry 512, a MAC (media access control) circuitry 514, a processor 516, a memory 518, and a hardware processing circuitry 520. A person skilled in the art will appreciate that other components not shown may be used in addition to the components shown to form a complete eNB.

In some embodiments, physical layer circuitry 512 includes a transceiver 513 for providing signals to and from UE 530. Transceiver 513 provides signals to and from UEs or other devices using one or more antennas 505. In some embodiments, MAC circuitry 514 controls access to the wireless medium. Memory 518 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 520 may comprise logic devices or circuitry to perform various operations. In some embodiments, processor 516 and memory 518 are arranged to perform the operations of hardware processing circuitry 520, such as operations described herein with reference to logic devices and circuitry within eNB 510 and/or hardware processing circuitry 520.

Accordingly, in some embodiments, eNB 510 may be a device comprising an application processor, a memory, one or more antenna ports, and an interface for allowing the application processor to communicate with another device.

As is also illustrated in FIG. 5, in some embodiments, UE 530 may include a physical layer circuitry 532, a MAC circuitry 534, a processor 536, a memory 538, a hardware processing circuitry 540, a wireless interface 542, and a display 544. A person skilled in the art would appreciate that other components not shown may be used in addition to the components shown to form a complete UE.

In some embodiments, physical layer circuitry 532 includes a transceiver 533 for providing signals to and from eNB 510 (as well as other eNBs). Transceiver 533 provides signals to and from eNBs or other devices using one or more antennas 525. In some embodiments, MAC circuitry 534 controls access to the wireless medium. Memory 538 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 542 may be arranged to allow the processor to communicate with another device.

Display 544 may provide a visual and/or tactile display for a user to interact with UE 530, such as a touch-screen display. Hardware processing circuitry 540 may comprise logic devices or circuitry to perform various operations. In some embodiments, processor 536 and memory 538 may be arranged to perform the operations of hardware processing circuitry 540, such as operations described herein with reference to logic devices and circuitry within UE 530 and/or hardware processing circuitry 540.

Accordingly, in some embodiments, UE 530 may be a device comprising an application processor, a memory, one or more antennas, a wireless interface for allowing the application processor to communicate with another device, and a touch-screen display.

Elements of FIG. 5, and elements of other figures having the same names or reference numbers, can operate or function in the manner described herein with respect to any such figures (although the operation and function of such elements is not limited to such descriptions). For example, FIGS. 6 and 7 also depict embodiments of eNBs, hardware processing circuitry of eNBs, UEs, and/or hardware processing circuitry of UEs, and the embodiments described with respect to FIG. 5 and FIGS. 6 and 7 can operate or function in the manner described herein with respect to any of the figures.

In addition, although eNB 510 and UE 530 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 6:
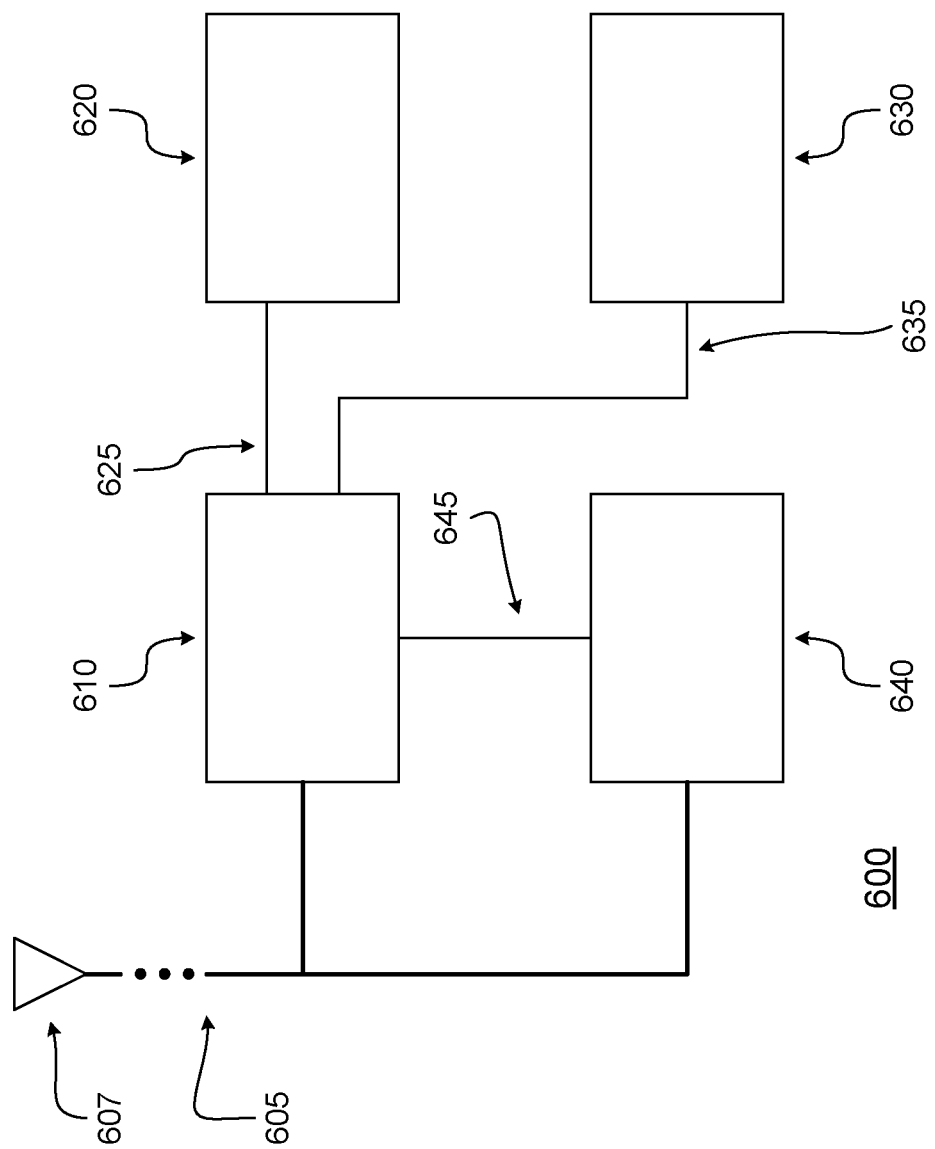
FIG. 6 illustrates hardware processing circuitries for a UE for non-scheduled UL operation on unlicensed spectrum, in accordance with some embodiments of the disclosure.

FIG. 6 illustrates hardware processing circuitries for a UE for non-scheduled UL operation on unlicensed spectrum, in accordance with some embodiments of the disclosure. With reference to FIG. 5, a UE may include various hardware processing circuitries discussed below (such as hardware processing circuitry 600 of FIG. 6), which may in turn comprise logic devices and/or circuitry operable to perform various operations. For example, in FIG. 5, UE 530 (or various elements or components therein, such as hardware processing circuitry 540, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 536 (and/or one or more other processors which UE 530 may comprise), memory 538, and/or other elements or components of UE 530 (which may include hardware processing circuitry 540) may be arranged to perform the operations of these hardware processing circuitries, such as operations described herein with reference to devices and circuitry within these hardware processing circuitries. In some embodiments, processor 536 (and/or one or more other processors which UE 530 may comprise) may be a baseband processor.

Returning to FIG. 6, an apparatus of UE 530 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 550). Antenna ports 605 may be coupled to one or more antennas 607 (which may be antennas 525). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 530 to wireless communication channel 550 (and from there to eNB 510, or to another eNB). Similarly, antennas 607 and antenna ports 605 may be operable to provide transmissions from a wireless communication channel 550 (and beyond that, from eNB 510, or another eNB) to UE 530.

With reference to FIG. 6, hardware processing circuitry 600 may comprise a first circuitry 610, a second circuitry 620, a third circuitry 630, and a fourth circuitry 640. First circuitry 610 may be operable to encode an N-PUCCH in an UL burst transmission. First circuitry 610 may also be operable to encode a PUSCH in the UL burst transmission. Second circuitry 620 may be operable to initiate the UL burst transmission subject to an LBT protocol on a channel of the wireless network. Second circuitry 620 may provide an initiation indicator to first circuitry 610 via an interface 625. The UL burst transmission may be initiated without a UL grant received from the eNB.

In some embodiments, the channel of the wireless network may be in unlicensed spectrum. For some embodiments, the N-PUCCH may carry one or more of: a UE identity; a HARQ process number; an NDI; an RV used; or a duration of the UL burst transmission. In some embodiments, the N-PUCCH may carry a selected MCS for the PUSCH. For some embodiments, the N-PUCCH may carry one or more of: a time-frequency resource allocation indicator; a CSI/CQI request; a number of component carriers used for PUSCH transmission; a UL transmission mode; or a UE CQI report.

For some embodiments, third circuitry 630 may select an MCS autonomously. Third circuitry 630 may provide an indicator of the MCS to first circuitry 610 via an interface 635. In some embodiments, fourth circuitry 640 may process a configuration transmission from the eNB carrying an MCS. Fourth circuitry 640 may provide an indicator of the MCS to first circuitry 610 via an interface 645.

In some embodiments, the N-PUCCH may carry one or more of: a HARQ process number having up to 4 bits; a selected MCS for the PUSCH having 5 bits; an RV used having 2 bits; or an NDI having 1 bit. For some embodiments, an N-PUCCH UCI may carry UL control signaling information comprising one or more of: a UE identity; an NDI; an RV used; a duration of the UL burst transmission; a selected MCS for the PUSCH; a time-frequency resource allocation indicator; a CSI/CQI request; a number of component carriers used for PUSCH transmission; a UL transmission mode; or a UE CQI report. In some embodiments, one or more of the first symbols of the N-PUCCH may carry UL control signaling information comprising one or more of: a UE identity; an NDI; an RV used; a duration of the UL burst transmission; an MCS for the PUSCH; a time-frequency resource allocation indicator; a CSI/CQI request; a number of component carriers used for PUSCH transmission; a UL transmission mode; or a UE CQI report.

In some embodiments, first circuitry 610, second circuitry 620, third circuitry 630, and fourth circuitry 640 may be implemented as separate circuitries. In other embodiments, one or more of first circuitry 610, second circuitry 620, third circuitry 630, and fourth circuitry 640 may be combined and implemented together in a circuitry without altering the essence of the embodiments.

Figure 7:
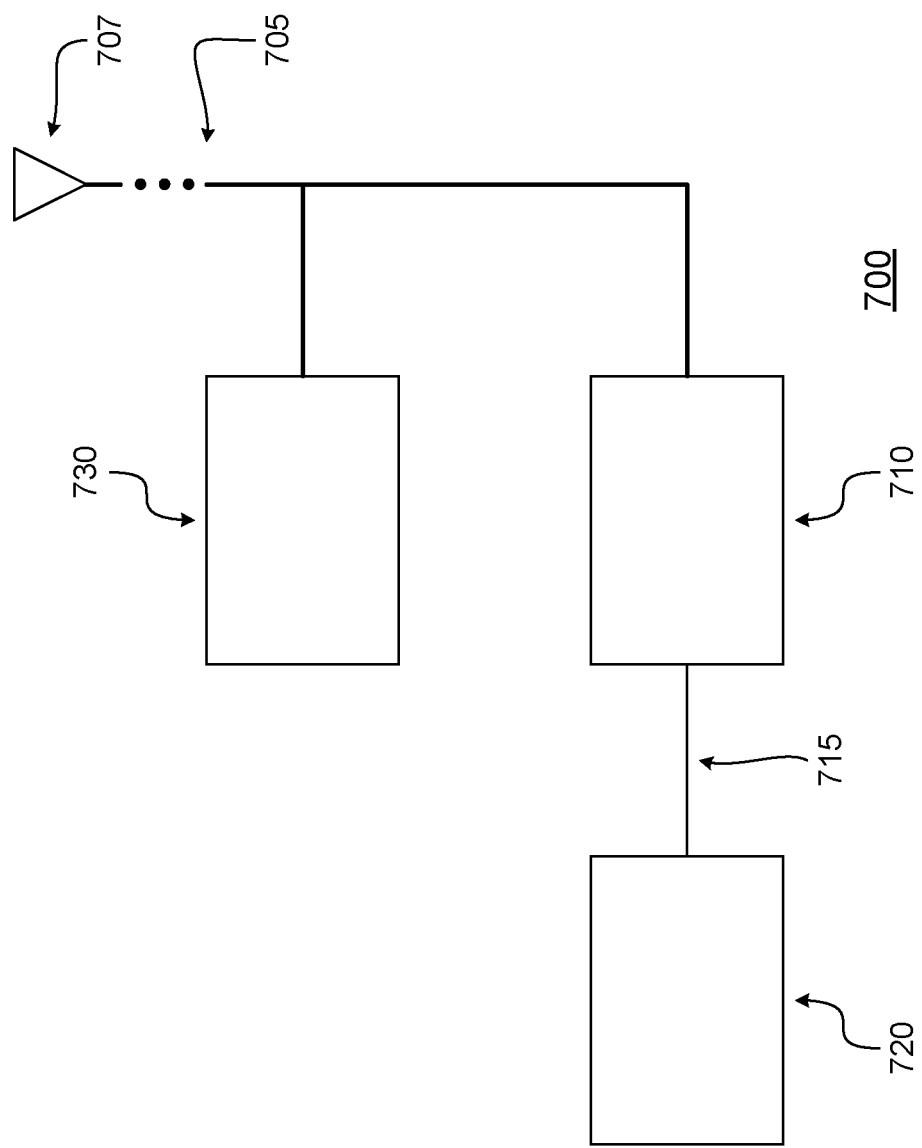
FIG. 7 illustrates hardware processing circuitries for an eNB for non-scheduled UL operation on unlicensed spectrum, in accordance with some embodiments of the disclosure.

FIG. 7 illustrates hardware processing circuitries for an eNB for non-scheduled UL operation on unlicensed spectrum, in accordance with some embodiments of the disclosure. With reference to FIG. 5, an eNB may include various hardware processing circuitries discussed below (such as hardware processing circuitry 700 of FIG. 7), which may in turn comprise logic devices and/or circuitry operable to perform various operations. For example, in FIG. 5, eNB 510 (or various elements or components therein, such as hardware processing circuitry 520, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 516 (and/or one or more other processors which eNB 510 may comprise), memory 518, and/or other elements or components of eNB 510 (which may include hardware processing circuitry 520) may be arranged to perform the operations of these hardware processing circuitries, such as operations described herein with reference to devices and circuitry within these hardware processing circuitries. In some embodiments, processor 516 (and/or one or more other processors which eNB 510 may comprise) may be a baseband processor.

Returning to FIG. 7, an apparatus of eNB 510 (or another eNB or base station), which may be operable to communicate with one or more UEs on a wireless network, may comprise hardware processing circuitry 700. In some embodiments, hardware processing circuitry 700 may comprise one or more antenna ports 705 operable to provide various transmissions over a wireless communication channel (such as wireless communication channel 550). Antenna ports 705 may be coupled to one or more antennas 707 (which may be antennas 505). In some embodiments, hardware processing circuitry 700 may incorporate antennas 707, while in other embodiments, hardware processing circuitry 700 may merely be coupled to antennas 707.

Antenna ports 705 and antennas 707 may be operable to provide signals from an eNB to a wireless communications channel and/or a UE, and may be operable to provide signals from a UE and/or a wireless communications channel to an eNB. For example, antenna ports 705 and antennas 707 may be operable to provide transmissions from eNB 510 to wireless communication channel 550 (and from there to UE 530, or to another UE). Similarly, antennas 707 and antenna ports 705 may be operable to provide transmissions from a wireless communication channel 550 (and beyond that, from UE 530, or another UE) to eNB 510.

With reference to FIG. 7, hardware processing circuitry 700 may comprise a first circuitry 710, a second circuitry 720, and a third circuitry 730. First circuitry 710 may be operable to detect a UL burst transmission on an idle channel of the wireless network. Second circuitry 720 may be operable to decode an N-PUCCH in the UL burst transmission. Second circuitry 720 may also be operable to decode a PUSCH in the UL burst transmission. First circuitry 710 may provide part or all of the UL burst transmission to second circuitry 720 via an interface 715. The UL burst transmission may be unassociated with a UL grant sent to the UE.

In some embodiments, the channel of the wireless network may be in unlicensed spectrum. For some embodiments, the N-PUCCH may carry one or more of: a UE identity; a HARQ process number; an NDI; an RV used; or a duration of the UL burst transmission. In some embodiments, the N-PUCCH may carry a selected MCS for the PUSCH. For some embodiments, the N-PUCCH may carry one or more of: a time-frequency resource allocation indicator; a CSI/CQI request; a number of component carriers used for PUSCH transmission; a UL transmission mode; or a UE CQI report.

For some embodiments, third circuitry 630 may be operable to generate a configuration transmission for the UE carrying an MCS. In some embodiments, the N-PUCCH may carry one or more of: a HARQ process number having up to 4 bits; a selected MCS for the PUSCH having 5 bits; an RV used having 2 bits; or an NDI having 1 bit. For some embodiments, an N-PUCCH UCI may carry UL control signaling information comprising one or more of: a UE identity; an NDI; an RV used; a duration of the UL burst transmission; a selected MCS for the PUSCH; a time-frequency resource allocation indicator; a CSI/CQI request; a number of component carriers used for PUSCH transmission; a UL transmission mode; or a UE CQI report. In some embodiments, one or more of the first symbols of the N-PUCCH may carry UL control signaling information comprising one or more of: a UE identity; an NDI; an RV used; a duration of the UL burst transmission; a selected MCS for the PUSCH; a time-frequency resource allocation indicator; a CSI/CQI request; a number of component carriers used for PUSCH transmission; a UL transmission mode; or a UE CQI report.

In some embodiments, first circuitry 710, second circuitry 720, and third circuitry 730 may be implemented as separate circuitries. In other embodiments, one or more of first circuitry 710, second circuitry 720, and third circuitry 730 may be combined and implemented together in a circuitry without altering the essence of the embodiments.

Figure 8:
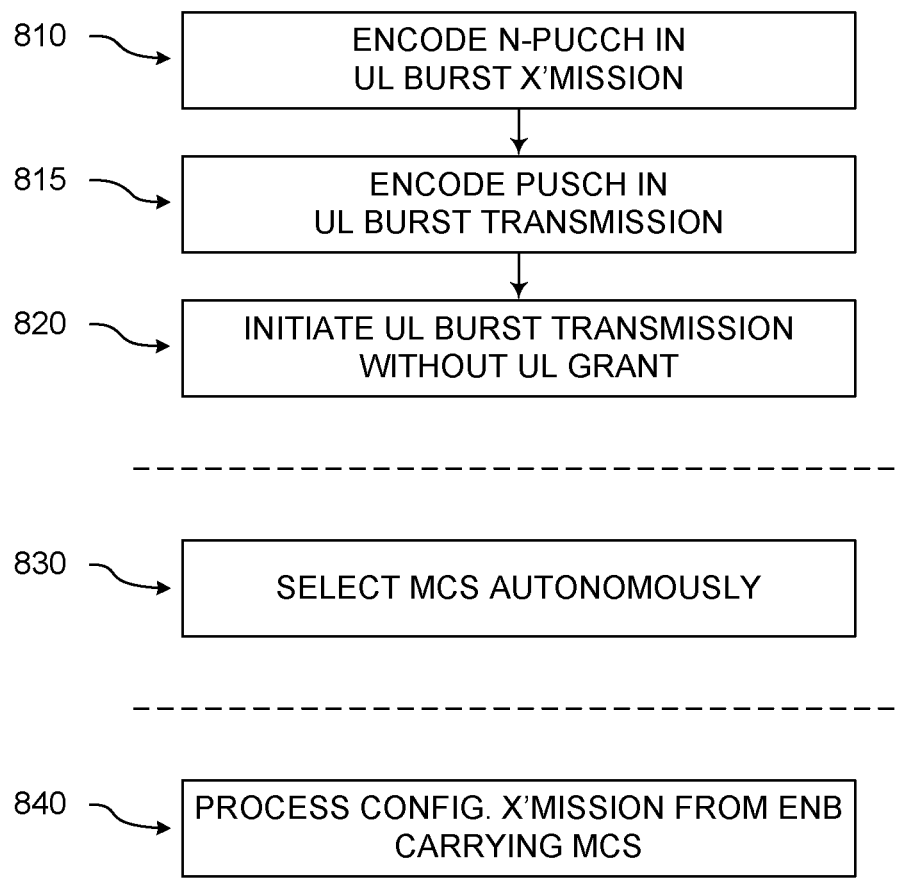
FIG. 8 illustrates methods for a UE for non-scheduled UL operation on unlicensed spectrum, in accordance with some embodiments of the disclosure.

FIG. 8 illustrates methods for a UE for non-scheduled UL operation on unlicensed spectrum, in accordance with some embodiments of the disclosure. With reference to FIG. 5, methods that may relate to UE 530 and hardware processing circuitry 540 are discussed below. Although the actions in the flowchart 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 530 and/or hardware processing circuitry 540 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Returning to FIG. 8, a method 800 may comprise an encoding 810, an encoding 815, an initiating 820, a selecting 830, and/or a processing 840. In encoding 810, an N-PUCCH may be encoded in a UL burst transmission. In encoding 815, a PUSCH may be encoded in the UL burst transmission. In initiating 820, the UL burst transmission may be initiated subject to an LBT protocol on a channel of the wireless network. The UL burst transmission is initiated without a UL grant received from the eNB.

In some embodiments, the channel of the wireless network may be in unlicensed spectrum. For some embodiments, the N-PUCCH may carry one or more of: a UE identity; a HARQ process number; an NDI; an RV used; or a duration of the UL burst transmission. In some embodiments, the N-PUCCH may carry a selected MCS for the PUSCH. For some embodiments, the N-PUCCH may carry one or more of: a time-frequency resource allocation indicator; a CSI/CQI request; a number of component carriers used for PUSCH transmission; a UL transmission mode; or a UE CQI report.

For some embodiments, in selecting 830, an MCS may be selected autonomously. In some embodiments, in processing 840, a configuration transmission from the eNB carrying an MCS may be processed.

In some embodiments, the N-PUCCH may carry one or more of: a HARQ process number having up to 4 bits; an MCS for the PUSCH having 5 bits; an RV used having 2 bits; or an NDI having 1 bit. For some embodiments, an N-PUCCH UCI carries UL control signaling information comprising one or more of: a UE identity; an NDI; an RV used; a duration of the UL transmission; a selected MCS for the PUSCH; a time-frequency resource allocation indicator; a CSI/CQI request; a number of component carriers used for PUSCH transmission; a UL transmission mode; or a UE CQI report. In some embodiments, one or more of the first symbols of the N-PUCCH may carry UL control signaling information comprising one or more of: a UE identity; an NDI; an RV used; a duration of the UL burst transmission; a selected MCS for the PUSCH; a time-frequency resource allocation indicator; a CSI/CQI request; a number of component carriers used for PUSCH transmission; a UL transmission mode; or a UE CQI report.

Figure 9:
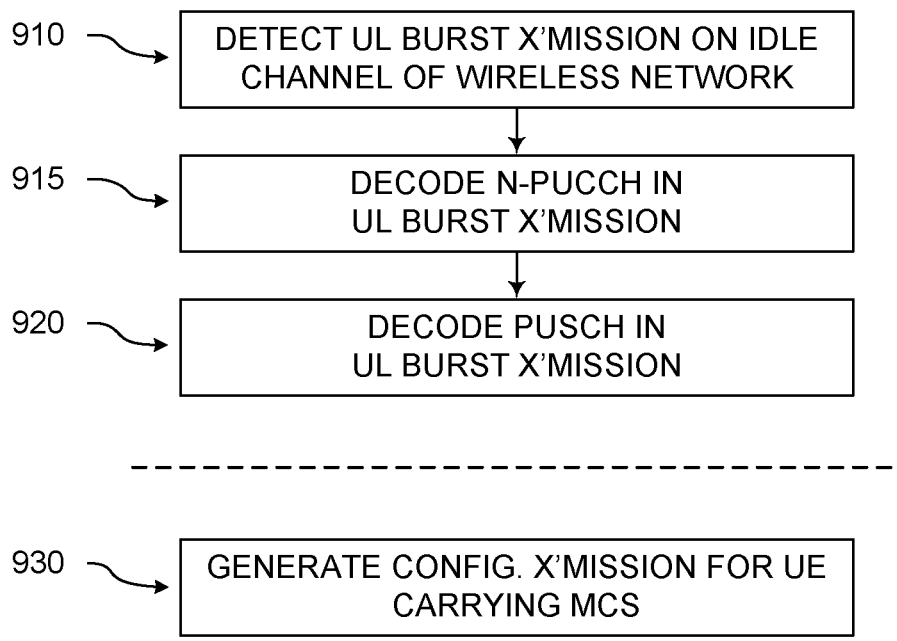
FIG. 9 illustrates methods for an eNB for non-scheduled UL operation on unlicensed spectrum, in accordance with some embodiments of the disclosure.

FIG. 9 illustrates methods for an eNB for non-scheduled UL operation on unlicensed spectrum, in accordance with some embodiments of the disclosure. With reference to FIG. 5, methods that may relate to UE 530 and hardware processing circuitry 540 are discussed below. Although the actions in the flowchart 900 of FIG. 9 are shown in a particular order, the order of the actions can be modified. Thus, the illustrated embodiments can be performed in a different order, and some actions may be performed in parallel. Some of the actions and/or operations listed in FIG. 9 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 530 and/or hardware processing circuitry 540 to perform an operation comprising the methods of FIG. 9. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 9.

Returning to FIG. 9, a method 900 may comprise a detecting 910, a decoding 915, a decoding 920, and/or a generating 930. In detecting 910, a UL burst transmission may be detected on an idle channel of the wireless network. In decoding 915, an N-PUCCH in the UL burst transmission may be decoded. In decoding 920, a PUSCH in the UL burst transmission may be decoded. The UL burst transmission may be unassociated with a UL grant sent to the UE.

In some embodiments, wherein the channel of the wireless network is in unlicensed spectrum. For some embodiments, the N-PUCCH may carry one or more of: a UE identity; a HARQ process number; an NDI; an RV used; or a duration of the UL burst transmission. In some embodiments, the N-PUCCH may carry a selected MCS for the PUSCH. For some embodiments, the N-PUCCH may carry one or more of: a time-frequency resource allocation indicator; a CSI/CQI request; a number of component carriers used for PUSCH transmission; a UL transmission mode; or a UE CQI report.

For some embodiments, in generating 930, a configuration transmission may be generated for the UE carrying an MCS.

In some embodiments, the N-PUCCH may carry one or more of: a HARQ process number having up to 4 bits; a selected MCS for the PUSCH having 5 bits; an RV used having 2 bits; or an NDI having 1 bit. For some embodiments, an N-PUCCH UCI may carry UL control signaling information comprising one or more of: a UE identity; an NDI; an RV used; a duration of the UL burst transmission; a selected MCS for the PUSCH; a time-frequency resource allocation indicator; a CSI/CQI request; a number of component carriers used for PUSCH transmission; a UL transmission mode; or a UE CQI report. In some embodiments, one or more of the first symbols of the N-PUCCH may carry UL control signaling information comprising one or more of: a UE identity; an NDI; an RV used; a duration of the UL burst transmission; a selected MCS for the PUSCH; a time-frequency resource allocation indicator; a CSI/CQI request; a number of component carriers used for PUSCH transmission; a UL transmission mode; or a UE CQI report.

Figure 10:
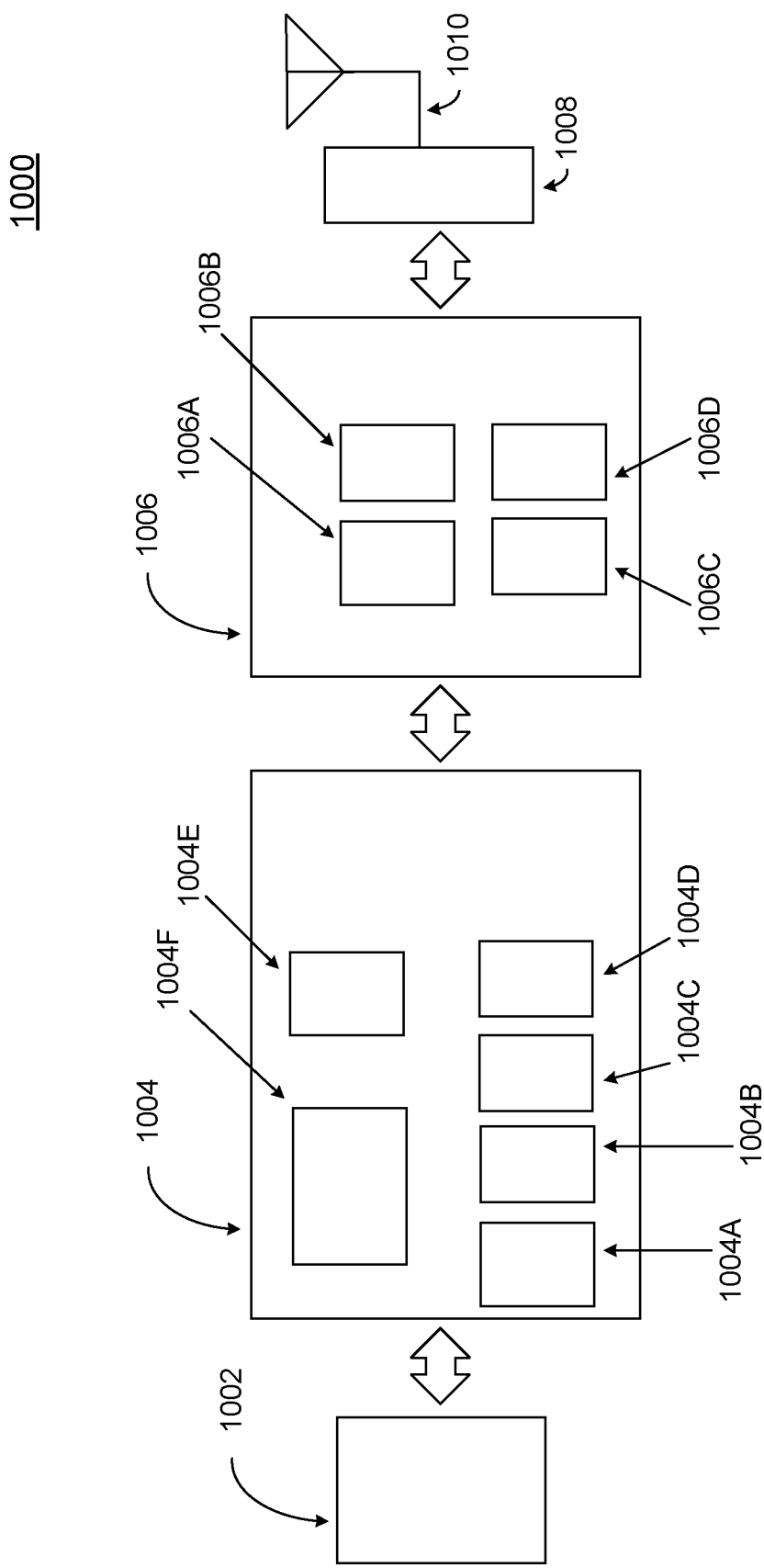
FIG. 10 illustrates example components of a UE device, in accordance with some embodiments of the disclosure.

FIG. 10 illustrates example components of a UE device, in accordance with some embodiments of the disclosure. In some embodiments, the UE device 1000 may include application circuitry 1002, baseband circuitry 1004, Radio Frequency (RF) circuitry 1006, front-end module (FEM) circuitry 1008, a low-power wake-up receiver (LP-WUR), and one or more antennas 1010, coupled together at least as shown. In some embodiments, the UE device 1000 may include additional elements such as, for example, memory/storage, display, camera, sensor, and/or input/output (I/O) interface.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004A, third generation (3G) baseband processor 1004B, fourth generation (4G) baseband processor 1004C, and/or other baseband processor(s) 1004D for other existing generations, generations in development or to be developed in the future (e.g., fifth generation (5G), 6G, etc.). The baseband circuitry 1004 (e.g., one or more of baseband processors 1004A-D) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1004E of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004F. The audio DSP(s) 1004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006A, amplifier circuitry 1006B and filter circuitry 1006C. The transmit signal path of the RF circuitry 1006 may include filter circuitry 1006C and mixer circuitry 1006A. RF circuitry 1006 may also include synthesizer circuitry 1006D for synthesizing a frequency for use by the mixer circuitry 1006A of the receive signal path and the transmit signal path. In some embodiments, the mixer circuitry 1006A of the receive signal path may be configured to down-convert RF signals received from the FEM circuitry 1008 based on the synthesized frequency provided by synthesizer circuitry 1006D. The amplifier circuitry 1006B may be configured to amplify the down-converted signals and the filter circuitry 1006C may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006A of the receive signal path may comprise passive mixers, although the scope of the embodiments is not limited in this respect.

In some embodiments, the mixer circuitry 1006A of the transmit signal path may be configured to up-convert input baseband signals based on the synthesized frequency provided by the synthesizer circuitry 1006D to generate RF output signals for the FEM circuitry 1008. The baseband signals may be provided by the baseband circuitry 1004 and may be filtered by filter circuitry 1006C. The filter circuitry 1006C may include a low-pass filter (LPF), although the scope of the embodiments is not limited in this respect.

In some embodiments, the mixer circuitry 1006A of the receive signal path and the mixer circuitry 1006A of the transmit signal path may include two or more mixers and may be arranged for quadrature down-conversion and/or up-conversion respectively. In some embodiments, the mixer circuitry 1006A of the receive signal path and the mixer circuitry 1006A of the transmit signal path may include two or more mixers and may be arranged for image rejection (e.g., Hartley image rejection). In some embodiments, the mixer circuitry 1006A of the receive signal path and the mixer circuitry 1006A may be arranged for direct down-conversion and/or direct up-conversion, respectively. In some embodiments, the mixer circuitry 1006A of the receive signal path and the mixer circuitry 1006A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006D may be a fractional-N synthesizer or a fractional N/N+1 synthesizer, although the scope of the embodiments is not limited in this respect as other types of frequency synthesizers may be suitable. For example, synthesizer circuitry 1006D may be a delta-sigma synthesizer, a frequency multiplier, or a synthesizer comprising a phase-locked loop with a frequency divider.

The synthesizer circuitry 1006D may be configured to synthesize an output frequency for use by the mixer circuitry 1006A of the RF circuitry 1006 based on a frequency input and a divider control input. In some embodiments, the synthesizer circuitry 1006D may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006D of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE 1000 comprises a plurality of power saving mechanisms. If the UE 1000 is in an RRC Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1000 may transition off to an RRC Idle state, where it disconnects from the network and does not perform operations such as channel quality feedback, handover, etc. The UE 1000 goes into a very low power state and it performs paging where again it periodically wakes up to listen to the network and then powers down again. Since the device might not receive data in this state, in order to receive data, it should transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

In addition, in various embodiments, an eNB may include components substantially similar to one or more of the example components of UE device 1000 described herein.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: encode a Non-scheduled Physical Uplink Control Channel (N-PUCCH) in an Uplink (UL) burst transmission; encode a Physical Uplink Shared Channel (PUSCH) in the UL burst transmission; and initiate the UL burst transmission subject to a Listen-Before-Talk (LBT) protocol on a channel of the wireless network, wherein the UL burst transmission is initiated without a UL grant received from the eNB.

In example 2, the apparatus of example 1, wherein the channel of the wireless network is in unlicensed spectrum.

In example 3, the apparatus of either of examples 1 or 2, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 4, the apparatus of any of examples 1 through 3, wherein the N-PUCCH carries a selected Modulation and Coding Scheme (MCS) for the PUSCH.

In example 5, the apparatus of any of examples 1 through 4, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 6, the apparatus of any of examples 1 through 5, wherein the one or more processors are further to: select a Modulation and Coding Scheme (MCS) autonomously.

In example 7, the apparatus of any of examples 1 through 6, wherein the one or more processors are further to: process a configuration transmission from the eNB carrying a Modulation and Coding Scheme (MCS).

In example 8, the apparatus of any of examples 1 through 7, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 9, the apparatus of any of examples 1 through 8, wherein an N-PUCCH Uplink Control Information (UCI) carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 10, the apparatus of any of examples 1 through 9, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 11 provides a User Equipment (UE) device comprising an application processor, a memory, one or more antennas, a wireless interface for allowing the application processor to communicate with another device, and a touch-screen display, the UE device including the apparatus of any of examples 1 through 10.

Example 12 provides a method comprising: encoding, for a User Equipment (UE) operable to communicate with an Evolved Node B (eNB), a Non-scheduled Physical Uplink Control Channel (N-PUCCH) in an Uplink (UL) burst transmission; encoding a Physical Uplink Shared Channel (PUSCH) in the UL burst transmission; and initiating the UL burst transmission subject to a Listen-Before-Talk (LBT) protocol on a channel of the wireless network, wherein the UL burst transmission is initiated without a UL grant received from the eNB.

In example 13, the method of example 12, wherein the channel of the wireless network is in unlicensed spectrum.

In example 14, the method of either of examples 12 or 13, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 15, the method of any of examples 12 through 14, wherein the N-PUCCH carries a selected Modulation and Coding Scheme (MCS) for the PUSCH.

In example 16, the method of any of examples 12 through 15, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 17, the method of any of examples 12 through 16, the operation comprising: selecting a Modulation and Coding Scheme (MCS) autonomously.

In example 18, the method of any of examples 12 through 17, the operation comprising: processing a configuration transmission from the eNB carrying a Modulation and Coding Scheme (MCS).

In example 19, the method of any of examples 12 through 18, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 20, the method of any of examples 12 through 19, wherein an N-PUCCH Uplink Control Information (UCI) carries UL control signaling information comprising one or more of: a UE identity; a New Data Indicator (NDI); a Redundancy Version (RV) used; a duration of the UL transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 21, the method of any of examples 12 through 20, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 22 provides machine readable storage media having machine executable instructions stored thereon that, when executed, cause one or more processors to perform a method according to any of examples 12 through 21.

Example 23 provides an apparatus of a User Equipment (UE) operable to communicate with an Evolved Node B (eNB) on a wireless network, comprising: means for encoding a Non-scheduled Physical Uplink Control Channel (N-PUCCH) in an Uplink (UL) burst transmission; means for encoding a Physical Uplink Shared Channel (PUSCH) in the UL burst transmission; and means for initiating the UL burst transmission subject to a Listen-Before-Talk (LBT) protocol on a channel of the wireless network, wherein the UL burst transmission is initiated without a UL grant received from the eNB.

In example 24, the apparatus of example 23, wherein the channel of the wireless network is in unlicensed spectrum.

In example 25, the apparatus of either of examples 23 or 24, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 26, the apparatus of any of examples 23 through 25, wherein the N-PUCCH carries a selected Modulation and Coding Scheme (MCS) for the PUSCH.

In example 27, the apparatus of any of examples 23 through 26, wherein the N-PUCCH carries one or more of: a time-frequency resource allocation indicator; a Channel State Information (CSI)/Channel Quality Information (CQI)

request; a number of component carriers used for PUSCH transmission; a UL transmission mode; or a UE CQI report.

In example 28, the apparatus of any of examples 23 through 27, the operation comprising: means for selecting a Modulation and Coding Scheme (MCS) autonomously.

In example 29, the apparatus of any of examples 23 through 28, the operation comprising: means for processing a configuration transmission from the eNB carrying a Modulation and Coding Scheme (MCS).

In example 30, the apparatus of any of examples 23 through 29, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 31, the apparatus of any of examples 23 through 30, wherein an N-PUCCH Uplink Control Information (UCI) carries UL control signaling information comprising one or more of: a UE identity; a New Data Indicator (NDI); a Redundancy Version (RV) used; a duration of the UL transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 32, the apparatus of any of examples 23 through 31, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 33 provides machine readable storage media having machine executable instructions that, when executed, cause one or more processors of a User Equipment (UE) to perform an operation comprising: encode a Non-scheduled Physical Uplink Control Channel (N-PUCCH) in an Uplink (UL) burst transmission; encode a Physical Uplink Shared Channel (PUSCH) in the UL burst transmission; and initiate the UL burst transmission subject to a Listen-Before-Talk (LBT) protocol on a channel of the wireless network, wherein the UL burst transmission is initiated without a UL grant received from the eNB.

In example 34, the machine readable storage media of example 33, wherein the channel of the wireless network is in unlicensed spectrum.

In example 35, the machine readable storage media of either of examples 33 or 34, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 36, the machine readable storage media of any of examples 33 through 35, wherein the N-PUCCH carries a selected Modulation and Coding Scheme (MCS) for the PUSCH.

In example 37, the machine readable storage media of any of examples 33 through 36, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 38, the machine readable storage media of any of examples 33 through 37, the operation comprising: select a Modulation and Coding Scheme (MCS) autonomously.

In example 39, the machine readable storage media of any of examples 33 through 38, the operation comprising: process a configuration transmission from the eNB carrying a Modulation and Coding Scheme (MCS).

In example 40, the machine readable storage media of any of examples 33 through 39, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 41, the machine readable storage media of any of examples 33 through 40, wherein an N-PUCCH Uplink Control Information (UCI) carries UL control signaling information comprising one or more of: a UE identity; a New Data Indicator (NDI); a Redundancy Version (RV) used; a duration of the UL transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 42, the machine readable storage media of any of examples 33 through 41, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 43 provides an apparatus of an Evolved Node B (eNB) operable to communicate with a User Equipment (UE) on a wireless network, comprising: one or more processors to: detect an Uplink (UL) burst transmission on an idle channel of the wireless network; decode a Non-scheduled Physical Uplink Control Channel (N-PUCCH) in the UL burst transmission; and decode a Physical Uplink Shared Channel (PUSCH) in the UL burst transmission, wherein the UL burst transmission is unassociated with a UL grant sent to the UE.

In example 44, the apparatus of example 43, wherein the channel of the wireless network is in unlicensed spectrum.

In example 45, the apparatus of either of examples 43 or 44, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 46, the apparatus of any of examples 43 through 45, wherein the N-PUCCH carries a selected Modulation and Coding Scheme (MCS) for the PUSCH.

In example 47, the apparatus of any of examples 43 through 46, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 48, the apparatus of any of examples 43 through 47, wherein the one or more processors are further to: generate a configuration transmission for the UE carrying a Modulation and Coding Scheme (MCS).

In example 49, the apparatus of any of examples 43 through 48, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 50, the apparatus of any of examples 43 through 49, wherein an N-PUCCH Uplink Control Information (UCI) carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 51, the apparatus of any of examples 43 through 50, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 52 provides an Evolved Node B (eNB) device comprising an application processor, a memory, one or more antenna ports, and an interface for allowing the application processor to communicate with another device, the eNB device including the apparatus of any of examples 43 through 51.

Example 53 provides a method comprising: detecting, for an Evolved Node-B (eNB) operable to communicate with a User Equipment (UE), an Uplink (UL) burst transmission on an idle channel of the wireless network; decoding a Non-scheduled Physical Uplink Control Channel (N-PUCCH) in the UL burst transmission; and decoding a Physical Uplink Shared Channel (PUSCH) in the UL burst transmission, wherein the UL burst transmission is unassociated with a UL grant sent to the UE.

In example 54, the method of example 53, wherein the channel of the wireless network is in unlicensed spectrum.

In example 55, the method of either of examples 53 or 54, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 56, the method of any of examples 53 through 55, wherein the N-PUCCH carries a selected Modulation and Coding Scheme (MCS) for the PUSCH.

In example 57, the method of any of examples 53 through 56, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 58, the method of any of examples 53 through 57, the operation comprising: generating a configuration transmission for the UE carrying a Modulation and Coding Scheme (MCS).

In example 59, the method of any of examples 53 through 58, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 60, the method of any of examples 53 through 59, wherein an N-PUCCH Uplink Control Information (UCI) carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 61, the method of any of examples 53 through 60, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 62 provides machine readable storage media having machine executable instructions stored thereon that, when executed, cause one or more processors to perform a method according to any of examples 53 through 61.

Example 63 provides an apparatus of an Evolved Node B (eNB) operable to communicate with a User Equipment (UE) on a wireless network, comprising: means for detecting an Uplink (UL) burst transmission on an idle channel of the wireless network; means for decoding a Non-scheduled Physical Uplink Control Channel (N-PUCCH) in the UL burst transmission; and means for decoding a Physical Uplink Shared Channel (PUSCH) in the UL burst transmission, wherein the UL burst transmission is unassociated with a UL grant sent to the UE.

In example 64, the apparatus of example 63, wherein the channel of the wireless network is in unlicensed spectrum.

In example 65, the apparatus of either of examples 63 or 64, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 66, the apparatus of any of examples 63 through 65, wherein the N-PUCCH carries a selected Modulation and Coding Scheme (MCS) for the PUSCH.

In example 67, the apparatus of any of examples 63 through 66, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 68, the apparatus of any of examples 63 through 67, the operation comprising: means for generating a configuration transmission for the UE carrying a Modulation and Coding Scheme (MCS).

In example 69, the apparatus of any of examples 63 through 68, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 70, the apparatus of any of examples 63 through 69, wherein an N-PUCCH Uplink Control Information (UCI) carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 71, the apparatus of any of examples 63 through 70, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

Example 72 provides machine readable storage media having machine executable instructions that, when executed, cause one or more processors of an Evolved Node B (eNB) to perform an operation comprising: detect an Uplink (UL) burst transmission on an idle channel of the wireless network; decode a Non-scheduled Physical Uplink Control Channel (N-PUCCH) in the UL burst transmission; and decode a Physical Uplink Shared Channel (PUSCH) in the UL burst transmission, wherein the UL burst transmission is unassociated with a UL grant sent to the UE.

In example 73, the machine readable storage media of example 72, wherein the channel of the wireless network is in unlicensed spectrum.

In example 74, the machine readable storage media of either of examples 72 or 73, wherein the N-PUCCH carries one or more of: a UE identity; a Hybrid Automatic Repeat Request (HARQ) process number; a New Data Indicator (NDI); a Redundancy Version (RV) used; or a duration of the UL burst transmission.

In example 75, the machine readable storage media of any of examples 72 through 74, wherein the N-PUCCH carries a selected Modulation and Coding Scheme (MCS) for the PUSCH.

In example 76, the machine readable storage media of any of examples 72 through 75, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

In example 77, the machine readable storage media of any of examples 72 through 76, the operation comprising: generate a configuration transmission for the UE carrying a Modulation and Coding Scheme (MCS).

In example 78, the machine readable storage media of any of examples 72 through 77, wherein the N-PUCCH carries one or more of: a Hybrid Automatic Repeat Request (HARQ) process number having up to 4 bits; a selected Modulation and Coding Scheme (MCS) for the PUSCH having 5 bits; a Redundancy Version (RV) used having 2 bits; or a New Data Indicator (NDI) having 1 bit.

In example 79, the machine readable storage media of any of examples 72 through 78, wherein an N-PUCCH Uplink Control Information (UCI) carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 80, the machine readable storage media of any of examples 72 through 79, wherein one or more of the first symbols of the N-PUCCH carries UL control signaling information comprising one or more of: a UE identity; a New Data Indicator (NDI); a Redundancy Version (RV) used; a duration of the UL burst transmission; a selected Modulation and Coding Scheme (MCS) for the PUSCH; a time-frequency resource allocation indicator; a Channel State Information (CSI)/Channel Quality Information (CQI) request; a number of component carriers used for PUSCH transmission; a UL transmission mode; or a UE CQI report.

In example 81, the apparatus of any of examples 1 through 10 and 43 through 51, wherein the one or more processors comprise a baseband processor.

In example 82, the apparatus of any of examples 1 through 10 and 43 through 51, comprising a transceiver circuitry for at least one of: generating transmissions, encoding transmissions, processing transmissions, or decoding transmissions.

In example 83, the apparatus of any of examples 1 through 10 and 43 through 51, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station (BS) on a wireless network, comprising: one or more processors to:
    encode a Non-scheduled Physical Uplink Control Channel (N-PUCCH) in at least a portion of a first symbol of a resource block of an Uplink (UL) burst transmission;
    multiplex a Physical Uplink Shared Channel (PUSCH) with the N-PUCCH within the resource block for the N-PUCCH by encoding the PUSCH in at least a portion of an other symbol within the resource block subsequent to the first symbol of the resource block of the UL burst transmission; and
    initiate the UL burst transmission subject to a Listen-Before-Talk (LBT) protocol on a channel of the wireless network, wherein the UL burst transmission is initiated without a UL grant received from the BS.

2. The UE of claim 1, wherein the channel of the wireless network is in an unlicensed spectrum.

3. The UE of claim 1, wherein the N-PUCCH carries one or more of: a UE identity; a Hybrid Automatic Repeat Request (HARD) process number; a New Data Indicator (NDI); a Redundancy Version (RV) used; or a duration of the UL burst transmission.

4. The UE of claim 1, wherein the N-PUCCH carries a selected Modulation and Coding Scheme (MCS) for the PUSCH.

5. The UE of claim 1, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

6. The UE of claim 1, wherein the one or more processors are further to: select a Modulation and Coding Scheme (MCS) autonomously.

7. A machine readable non-transitory storage medium having machine executable instructions that, when executed, cause one or more processors of a User Equipment (UE) to perform operations comprising:
   encoding a Non-scheduled Physical Uplink Control Channel (N-PUCCH) in at least a portion of a first symbol of a resource block of an Uplink (UL) burst transmission;
   multiplexing a Physical Uplink Shared Channel (PUSCH) with the N-PUCCH within the resource block for the N-PUCCH by encoding the PUSCH in at least a portion of an other symbol within the resource block subsequent to the first symbol of the resource block of the UL burst transmission; and
   initiating the UL burst transmission to a base station (BS) subject to a Listen-Before-Talk (LBT) protocol on a channel of the wireless network, wherein the UL burst transmission is initiated without a UL grant received from the BS.

8. The machine readable non-transitory storage medium of claim 7, wherein the channel of the wireless network is in an unlicensed spectrum.

9. The machine readable non-transitory storage medium of claim 7, wherein the N-PUCCH carries one or more of: a UE identity; a Hybrid Automatic Repeat Request (HARD) process number; a New Data Indicator (NDI); a Redundancy Version (RV) used; or a duration of the UL burst transmission.

10. The machine readable non-transitory storage medium of claim 7, wherein the N-PUCCH carries a selected Modulation and Coding Scheme (MCS) for the PUSCH.

11. The machine readable non-transitory storage medium of claim 7, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

12. The machine readable non-transitory storage medium of claim 7, the operations further comprising: selecting a Modulation and Coding Scheme (MCS) autonomously.

13. A base station (BS) operable to communicate with a User Equipment (UE) on a wireless network, comprising:
   one or more processors to:
   detect an Uplink (UL) burst transmission on an idle channel of the wireless network;
   decode a Non-scheduled Physical Uplink Control Channel (N-PUCCH) in at least a portion of a first symbol of a resource block of the UL burst transmission;
   determine a Physical Uplink Shared Channel (PUSCH) that is multiplexed with the N-PUCCH within the resource block for the N-PUCCH; and
   decode the PUSCH in at least a portion of an other symbol within the resource block subsequent to the first symbol of the resource block of the UL burst transmission, wherein the UL burst transmission is unassociated with a UL grant sent to the UE.

14. The BS of claim 13, wherein the idle channel of the wireless network is in an unlicensed spectrum.

15. The BS of claim 13, wherein the N-PUCCH carries one or more of: a UE identity; a Hybrid Automatic Repeat Request (HARD) process number; a New Data Indicator (NDI); a Redundancy Version (RV) used; or a duration of the UL burst transmission.

16. The BS of claim 13, wherein the N-PUCCH carries a selected Modulation and Coding Scheme (MCS) for the PUSCH.

17. The BS of claim 13, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

18. The BS of claim 13, wherein the one or more processors are further to: generate a configuration transmission for the UE carrying a Modulation and Coding Scheme (MCS).

19. A machine readable non-transitory storage medium having machine executable instructions that, when executed, cause one or more processors of a base station (BS) to perform operations comprising:
   detecting an Uplink (UL) burst transmission on an idle channel of the wireless network;
   decoding a Non-scheduled Physical Uplink Control Channel (N-PUCCH) in at least a portion of a first symbol of a resource block of the UL burst transmission;
   determining a Physical Uplink Shared Channel (PUSCH) that is multiplexed with the N-PUCCH within the resource block for the N-PUCCH; and
   decoding the PUSCH in at least a portion of an other symbol within the resource block subsequent to the first symbol of the resource block of the UL burst transmission, wherein the UL burst transmission is unassociated with a UL grant sent to the UE.

20. The machine readable non-transitory storage medium of claim 19, wherein the idle channel of the wireless network is in an unlicensed spectrum.

21. The machine readable non-transitory storage medium of claim 19, wherein the N-PUCCH carries one or more of: a UE identity; a Hybrid Automatic Repeat Request (HARD) process number; a New Data Indicator (NDI); a Redundancy Version (RV) used; or a duration of the UL burst transmission.

22. The machine readable non-transitory storage medium of claim 19, wherein the N-PUCCH carries a selected Modulation and Coding Scheme (MCS) for the PUSCH.

23. The machine readable non-transitory storage medium of claim 19, wherein the N-PUCCH carries one or more of: a time-frequency resource allocation indicator; a Channel State Information (CSI)/Channel Quality Information (CQI) request; a number of component carriers used for PUSCH transmission; a UL transmission mode; or a UE CQI report.

24. The machine readable non-transitory storage medium of claim 19, the operations comprising: generating a configuration transmission for the UE carrying a Modulation and Coding Scheme (MCS).

\* \* \* \* \*